(12) United States Patent
Lew

(10) Patent No.: US 11,573,808 B2
(45) Date of Patent: Feb. 7, 2023

(54) METHODS OF PROVIDING AN INTEGRATED INTERFACE THAT INCLUDES A VIRTUAL MOBILE DEVICE

(71) Applicant: salesforce.com, inc., San Francisco, CA (US)

(72) Inventor: Eugene Lee Lew, Olney, MD (US)

(73) Assignee: Salesforce, Inc., San Francisco, CA (US)

( * ) Notice: Subject to any disclaimer, the term of this patent is extended or adjusted under 35 U.S.C. 154(b) by 166 days.

(21) Appl. No.: 16/919,152

(22) Filed: Jul. 2, 2020

(65) Prior Publication Data

US 2022/0004403 A1    Jan. 6, 2022

(51) Int. Cl.
| | |
|---|---|
| *H04L 67/53* | (2022.01) |
| *H04L 67/01* | (2022.01) |
| *H04L 51/18* | (2022.01) |
| *H04L 51/046* | (2022.01) |
| *G06F 16/9538* | (2019.01) |

(Continued)

(52) U.S. Cl.
CPC .......... *G06F 9/451* (2018.02); *G06F 16/9535* (2019.01); *G06F 16/9538* (2019.01); *G06Q 10/105* (2013.01); *G06Q 30/016* (2013.01); *G06Q 30/0185* (2013.01); *H04L 67/01* (2022.05); *H04L 67/53* (2022.05);
(Continued)

(58) Field of Classification Search
CPC .. G06F 9/451; G06F 16/9535; G06F 16/9538;
G06F 3/0482; G06Q 10/105; G06Q 30/016; G06Q 30/0185; G06Q 10/107; H04L 67/20; H04L 67/42; H04L 51/046
See application file for complete search history.

(56) References Cited

U.S. PATENT DOCUMENTS

| | | |
|---|---|---|
| 5,477,263 A | 12/1995 | O'Callaghan |
| 5,570,241 A | 10/1996 | Nielsen |

(Continued)

OTHER PUBLICATIONS

Old Guy Geek (Microsoft Your Phone App—Make Cell Phone Calls From Your Desktop or Laptop, published on YouTube Oct. 10, 2019) (Year: 2019).*

(Continued)

*Primary Examiner* — Stephen S Hong
*Assistant Examiner* — Ahamed I Nazar
(74) *Attorney, Agent, or Firm* — Butzel Long

(57) ABSTRACT

Implementations of the disclosed subject matter provide outputting an integrated interface to be displayed in a browser including a text-based interface of an application and an interface for a virtual mobile device separate from the text-based interface, where the virtual mobile device emulates operations and a user interface of a specific type of hardware mobile device. An indication of a communication may be received from a mobile device. A customer name associated with the mobile device may be obtained based on at least one of a certificate that includes the customer name retrieved by the server from a third party server, and a database record that includes the customer name that is retrieved by the server from a database. The obtained customer name may be displayed on the virtual mobile device portion of the integrated interface in association with the communication from the mobile device of the customer.

16 Claims, 13 Drawing Sheets

(51) Int. Cl.
*G06F 16/9535* (2019.01)
*G06F 9/451* (2018.01)
*G06F 3/0482* (2013.01)
*G06Q 30/00* (2012.01)
*G06Q 10/10* (2012.01)

(52) U.S. Cl.
CPC ......... *G06F 3/0482* (2013.01); *G06Q 10/107* (2013.01); *H04L 51/046* (2013.01)

(56) References Cited

U.S. PATENT DOCUMENTS

| | | | |
|---|---|---|---|
| 5,594,492 A | 1/1997 | O'Callaghan | |
| 5,635,979 A | 6/1997 | Kostreski | |
| 8,694,031 B2 | 4/2014 | Lew | |
| 8,918,085 B2 | 12/2014 | Lew | |
| 9,271,129 B2 | 2/2016 | Lew | |
| 9,356,907 B2 | 5/2016 | Lew | |
| 9,532,197 B1 | 12/2016 | Lew | |
| 9,854,415 B2 | 12/2017 | Lew | |
| 10,064,049 B1 | 8/2018 | Lew | |
| 10,187,761 B2 | 1/2019 | Lew | |
| 10,348,671 B2 | 7/2019 | Lew | |
| 10,360,309 B2 | 7/2019 | Chisholm | |
| 10,439,895 B2 | 10/2019 | Lew | |
| 10,455,377 B2 | 10/2019 | Lew | |
| 10,505,889 B2 | 12/2019 | Lew | |
| 10,715,522 B2 | 7/2020 | Lew | |
| 10,819,635 B2 | 10/2020 | Lew | |
| 2002/0116496 A1 | 8/2002 | Lew | |
| 2002/0116655 A1 | 8/2002 | Lew | |
| 2002/0116721 A1 | 8/2002 | Dobes | |
| 2002/0138561 A1 | 9/2002 | Chatfield | |
| 2003/0105763 A1 | 6/2003 | Chatfield | |
| 2009/0086947 A1* | 4/2009 | Vendrow | H04M 3/02 379/201.12 |
| 2009/0209298 A1* | 8/2009 | Abeta | H04M 1/575 455/41.2 |
| 2012/0221962 A1 | 8/2012 | Lew | |
| 2012/0226759 A1 | 9/2012 | Lew | |
| 2013/0117742 A1* | 5/2013 | Newell | G06F 9/441 718/1 |
| 2013/0310089 A1 | 11/2013 | Gianoukos | |
| 2014/0198796 A1 | 7/2014 | Lew | |
| 2015/0163654 A1 | 6/2015 | Lew | |
| 2015/0382263 A1* | 12/2015 | Jain | H04L 67/52 455/432.1 |
| 2016/0073243 A1 | 3/2016 | Lew | |
| 2016/0112875 A1* | 4/2016 | Kasravi | H04W 12/06 455/411 |
| 2016/0127358 A1* | 5/2016 | Engelking | H04W 12/088 713/156 |
| 2016/0255041 A1 | 9/2016 | Lew | |
| 2017/0039037 A1* | 2/2017 | Howett | G06F 9/452 |
| 2017/0104959 A1* | 4/2017 | Bracken | H04M 7/003 |
| 2018/0097756 A1 | 4/2018 | Lew | |
| 2019/0007355 A1 | 1/2019 | Lew | |
| 2020/0026966 A1* | 1/2020 | Nagarajan | G06F 40/226 |
| 2020/0036674 A1 | 1/2020 | Lew | |
| 2020/0220837 A1 | 7/2020 | Lew | |
| 2020/0252303 A1 | 8/2020 | Lew | |
| 2020/0252379 A1 | 8/2020 | Lew | |
| 2020/0252447 A1 | 8/2020 | Lew | |
| 2020/0296098 A1 | 9/2020 | Lew | |

OTHER PUBLICATIONS

AsoftClick (Make and Receive Phone Calls on your Windows 10 PC [with Your Phone app], published on YouTube on Mar. 17, 2020) (Year: 2020).*

Microsoft Teams (How to Make a Phone Call and How To Receive Calls, published Jun. 3, 2020) (Year: 2020).*

* cited by examiner

METHODS OF PROVIDING AN INTEGRATED INTERFACE THAT INCLUDES A VIRTUAL MOBILE DEVICE

BACKGROUND

User interfaces for customer relationship management (CRM) applications and other applications have traditionally been text-based, including those applications that operate within a web browser. Communication applications, such as texting applications, have recently been integrated with the text-based interface of CRM applications, but such texting applications do not resemble texting applications of a mobile computing device that a user is familiar with. Such integrated texting applications typically require training to use, and are not intuitive for users.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 3 shows a text-based interface of an application.

FIG. 5 shows an integrated interface to be displayed in a browser that includes the text-based interface of an application and an interface for a virtual mobile device separate from the text-based interface according to an implementation of the disclosed subject matter.

DETAILED DESCRIPTION

Figure 1:
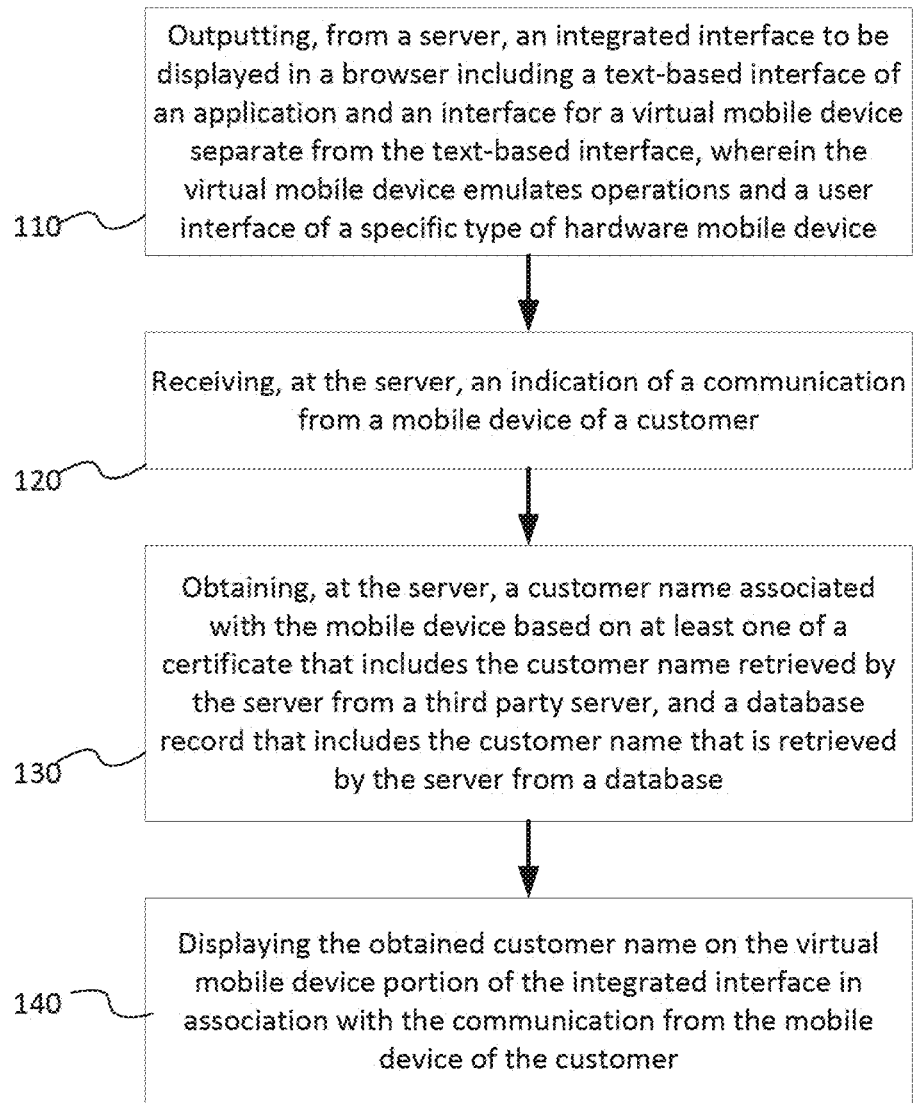
FIG. 1 shows an example method of displaying an obtained customer name on a virtual mobile device portion of an integrated interface in association with a communication from a mobile device of a customer according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide a combined virtual mobile phone with a text-based application to form an integrated user interface (UI) to be displayed in a browser. The virtual mobile device may be emulated, and may have one or more functions such as text messaging, voice dialing, video calling, email messaging, and the like, which may mirror those of a hardware mobile device. The integrated interface may reduce the amount of time to train users on application user interfaces (UIs).

Present systems provide applications which have generic text messaging interfaces that only mimic a texting interface of a mobile device (e.g., a smart phone). Users of such applications must typically receive training to use such interfaces, as they are not similar enough to the interfaces of mobile devices. The present invention provides a full emulation and/or virtualization of a mobile device within a web-based application.

Implementations of the disclosed subject matter may display an obtained customer name on a virtual mobile device portion of an integrated interface in association with a communication from a mobile device of a customer. In some implementations, an enterprise name may be transmitted to a mobile device of a customer to be displayed in association with a communication between the virtual mobile device and the mobile device of a customer.

Figure 3:
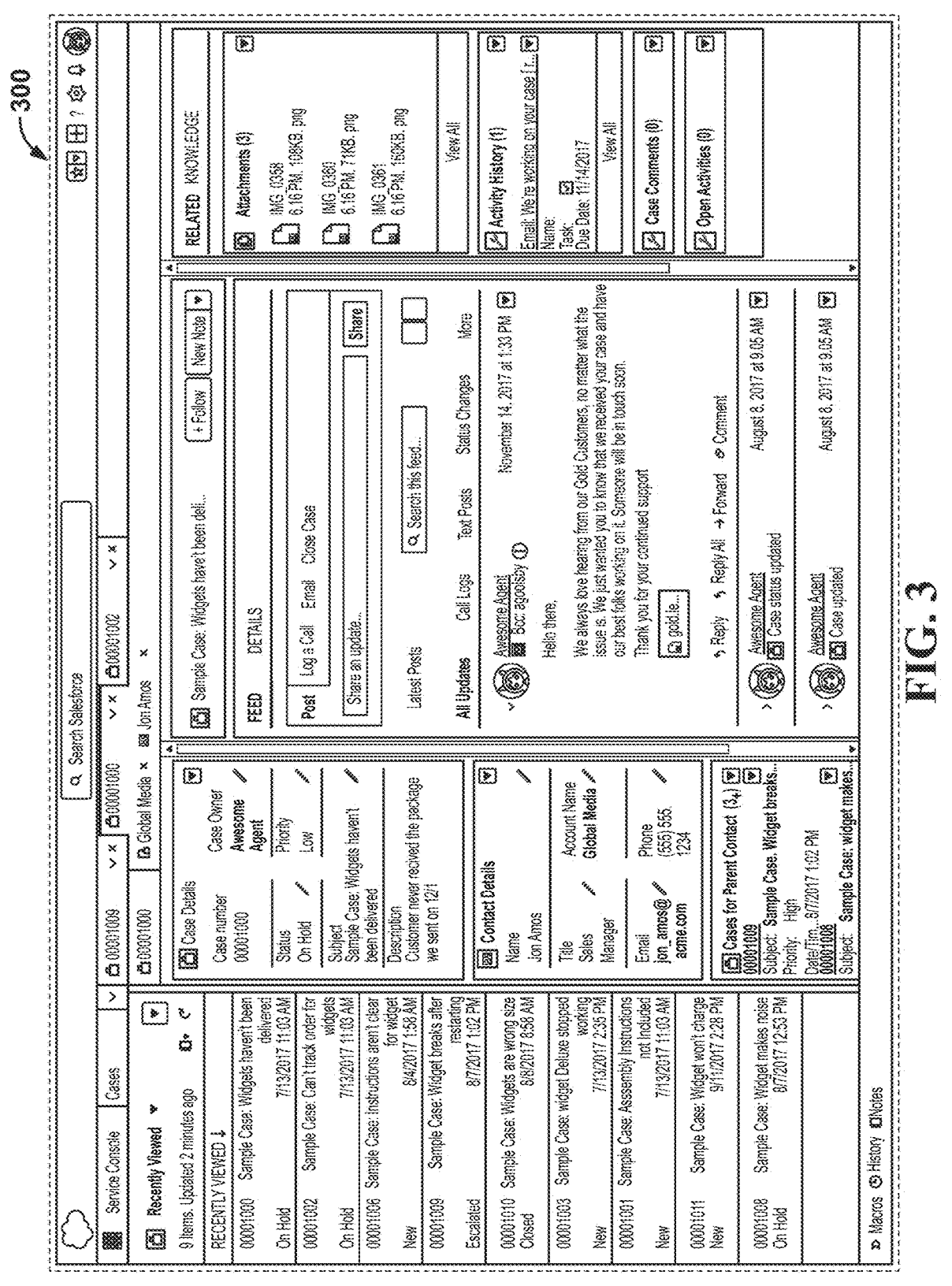
Figure 4:
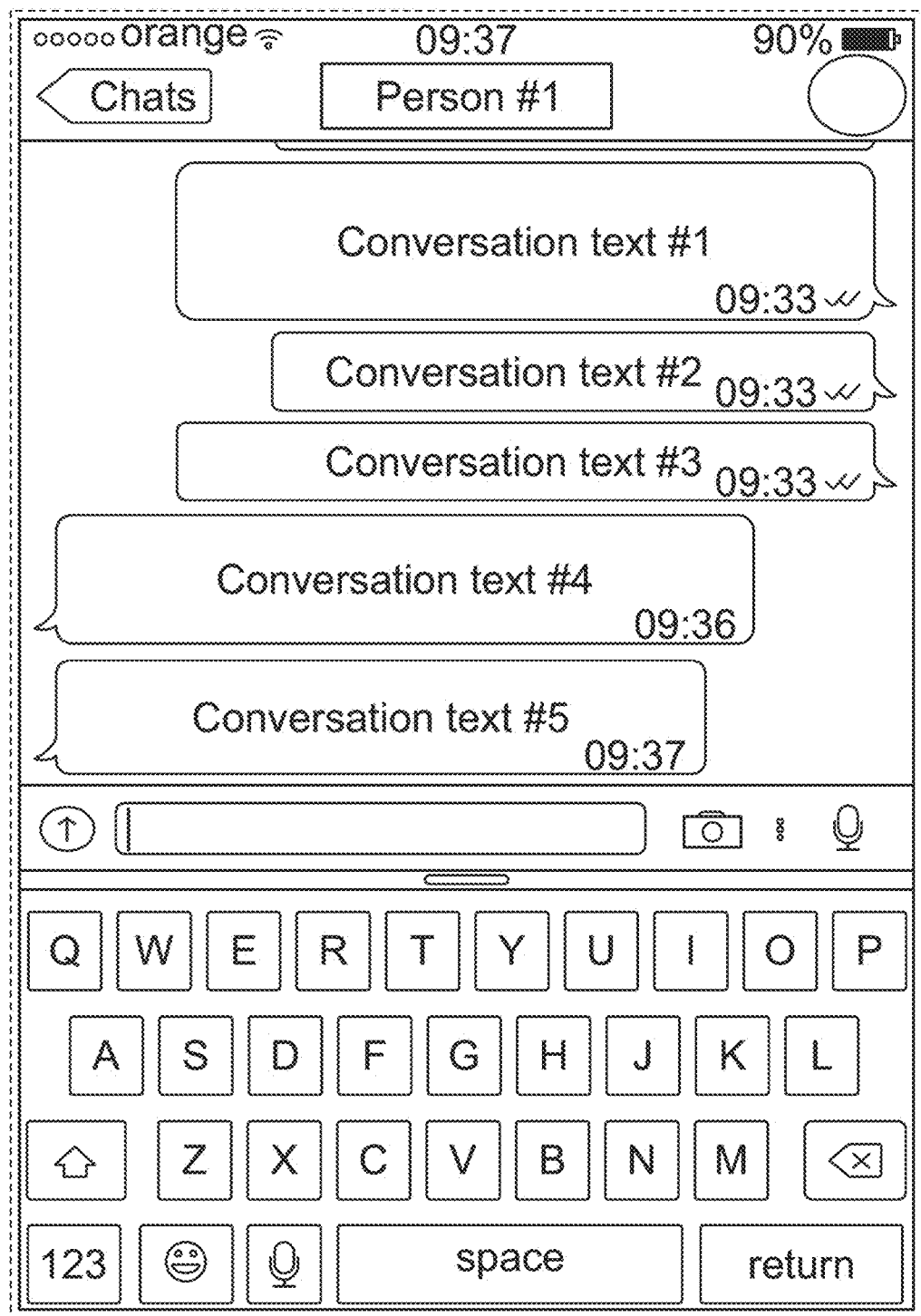
FIG. 4 shows an interface for a communications application of a mobile device.
Figure 5:
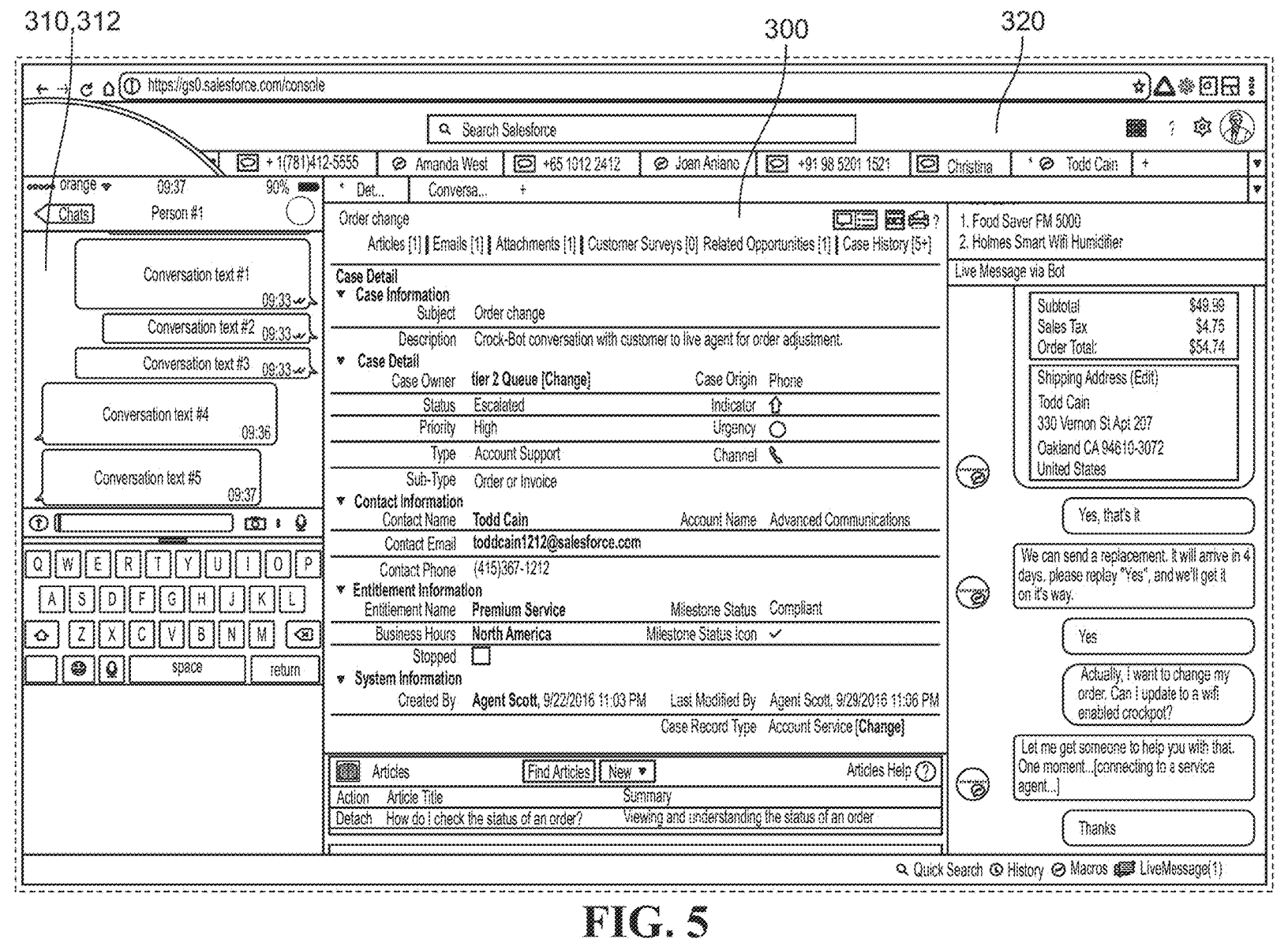

The integrated interface may include a text-based interface for an application, such as interface 300 shown in FIG. 3. The text-based interface may be for a customer relationship management (CRM) application or any other text-based application. The text-based application may be displayed in a web browser. The integrated interface may include an interface for a virtual mobile device 312 shown in FIG. 5, which may be similar to interface 310 of a hardware mobile device shown in FIG. 4. The virtual mobile device may emulate the operation and/or interface of a particular type of hardware mobile device, so that the operations and interface of the virtual mobile device may be indistinguishable by a user from a hardware mobile device. FIG. 5 shows an integrated interface 320 that includes text-based interface 300 and the interface of the virtual mobile device 312.

Figure 6:
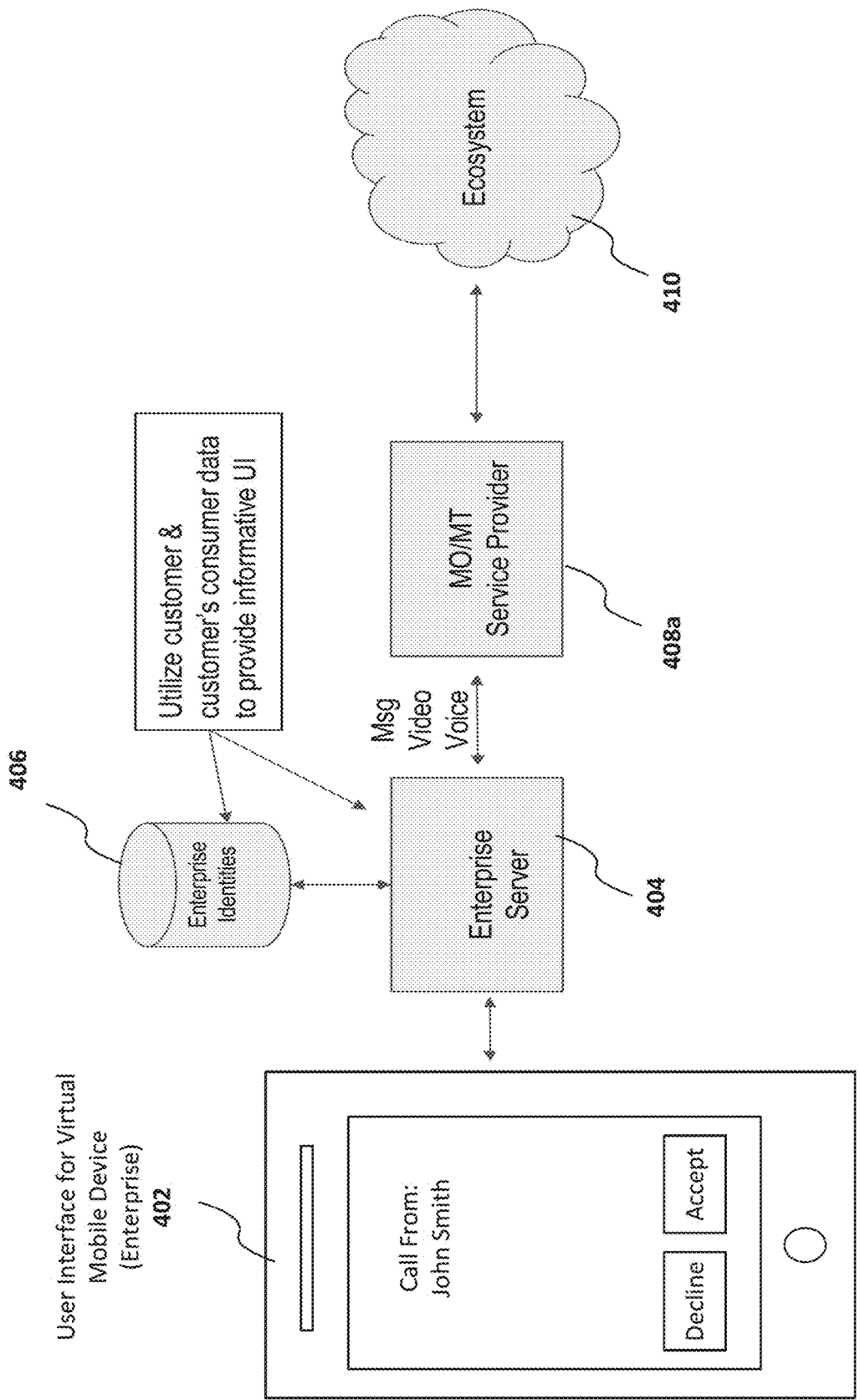
FIG. 6 shows the virtual mobile device interconnection to provide a name of a customer who is initiating a communication according to an implementation of the disclosed subject matter.
Figure 7:
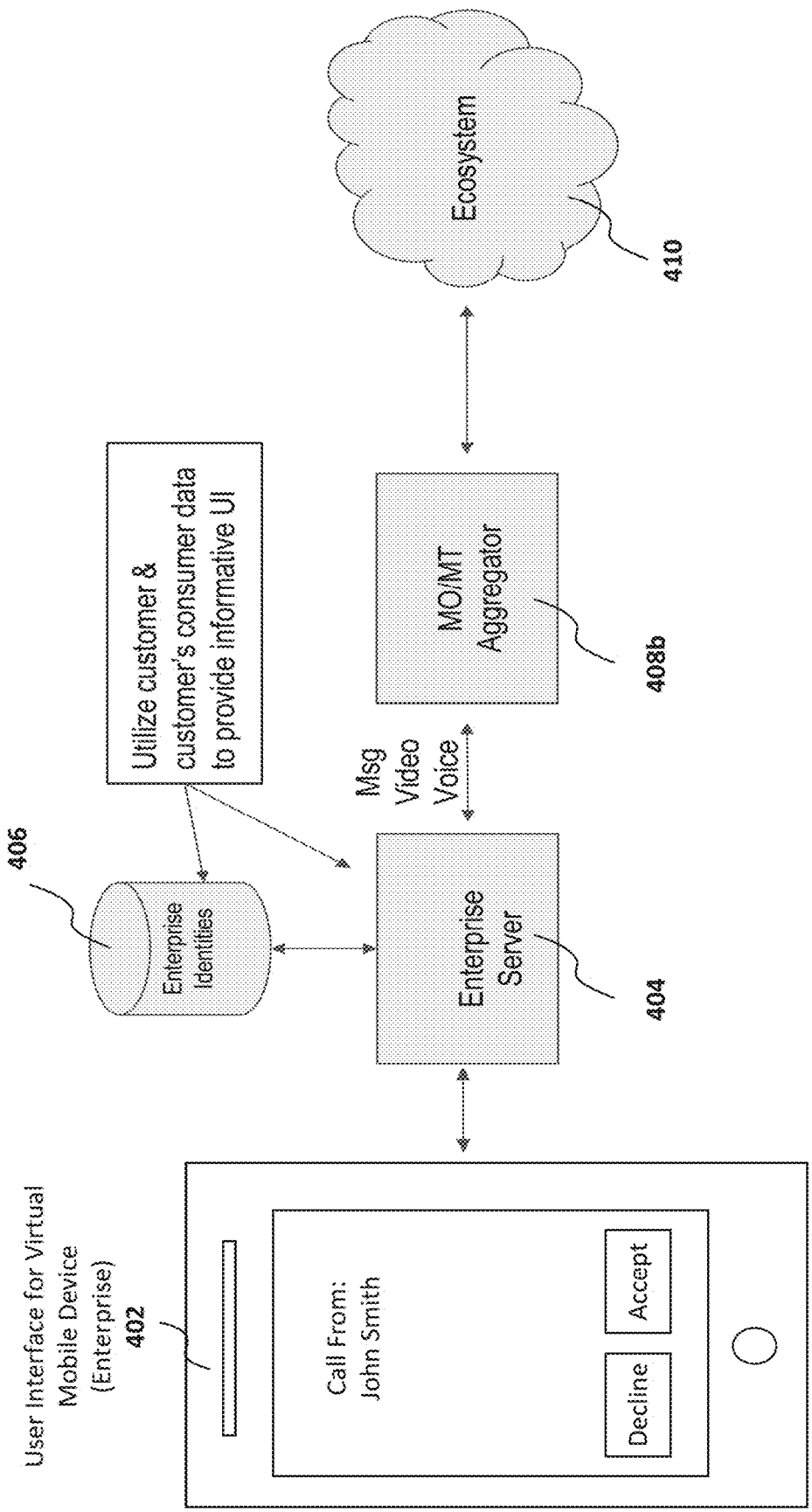
FIG. 7 shows an alternative virtual mobile device interconnection to provide a name of the customer who is initiating a communication according to an implementation of the disclosed subject matter.

The interface of the virtual mobile device may display a customer name based on a communication from a customer, such as shown in arrangement 400*a* of FIG. 6. A call, text, video communication, email, or the like that may be initiated by a customer may be displayed on the interface for a virtual mobile device 402 as shown in FIG. 6. The virtual mobile device 402 may be viewed by a user of the integrated interface, such as an agent, representative, associate, or the like, on device 900, shown in FIG. 12. The communication may be received by ecosystem 410, which may be a communications network, or the like. As discussed in detail below, the mobile originated (MO) service provider and/or mobile terminated (MT) service provider (e.g., MO/MT service provider 408*a*) may receive the communication, and may determine the name of the customer initiating the communication. For example, the MO/MT service provider may communicate with a database to retrieve the name of the customer. In some implementations, such as shown in FIG. 7, a MO/MT aggregator 408*b* may receive the communication, and may determine the name of the customer initiating the communication. The MO/MT aggregator may communicate with a database to retrieve the name of the customer.

The communication and/or the name of the customer may be provided to the enterprise server 404. The enterprise server 404 may retrieve one or more records associated with the customer name from the enterprise database 406. The interface of the virtual mobile device 402 may display the name of the customer initiating the communication. The text-based portion of the integrated interface (e.g., text-based interface 300 shown in FIG. 5) may display customer information, such as customer contact information, products and/or services purchased, or the like.

Figure 8:
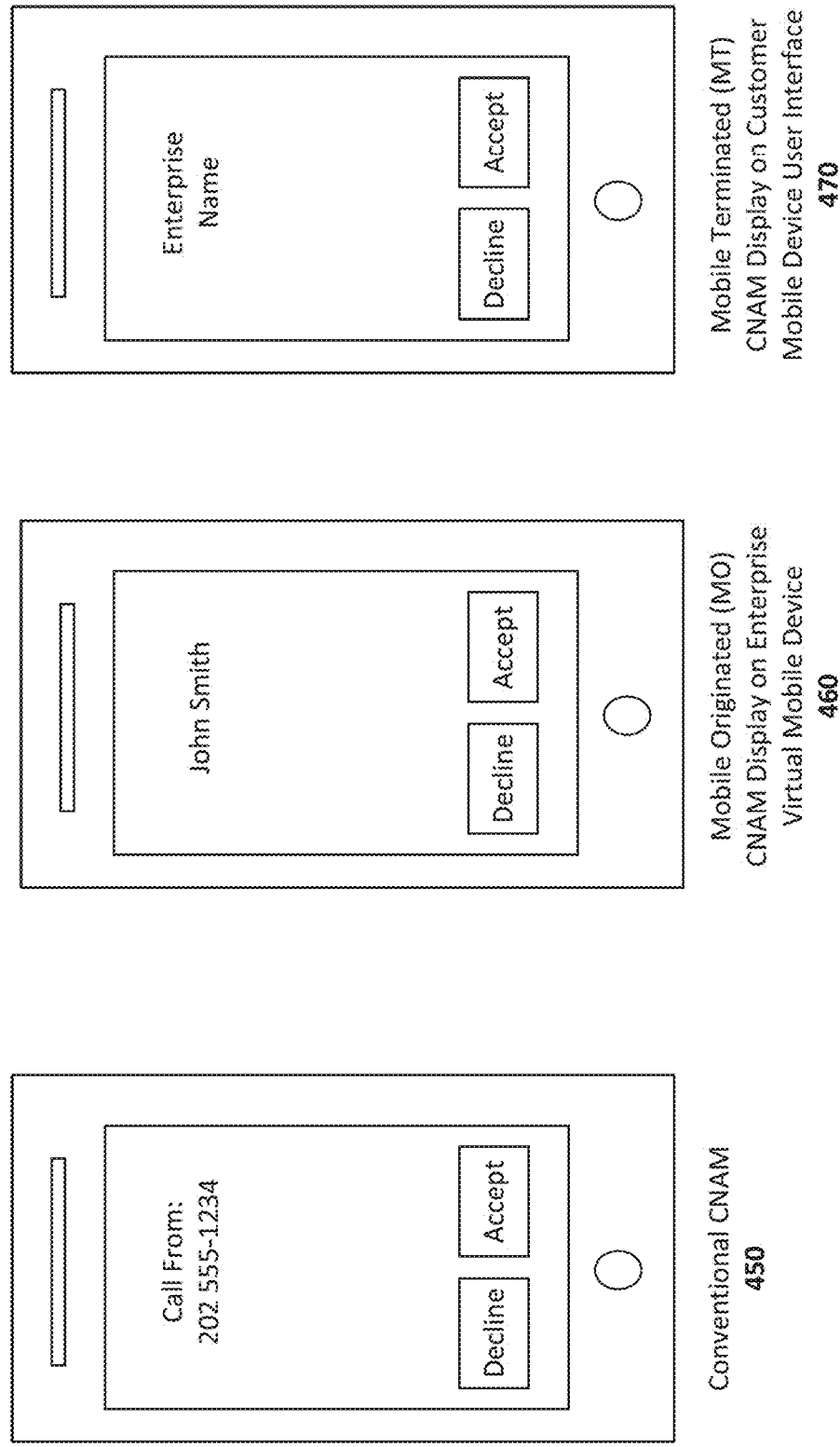
FIG. 8 shows identification of customers for conventional CNAM (Caller Name Delivery), mobile originated (MO) CNAM, and mobile terminated (MT) CNAM according to an implementation of the disclosed subject matter.

Implementations of the disclosed subject matter provide advantages over conventional CNAM (Caller Name delivery), used in telephone networks to provide name identification of the calling party. Interface 450 of FIG. 8 shows that when conventional CNAM is used with a hardware mobile device, a customer's telephone number is displayed, but not the name of the customer initiating the call. In implementations of the disclosed subject matter, when a customer initiates a communication with an enterprise, the mobile originated (MO) service provider may provide the name of the customer to be displayed on the virtual mobile device of the integrated interface, as shown in interface 460 of FIG. 8. In some implementations, when the enterprise initiates a communication with a customer, the mobile terminated service provider may provide the enterprise name to be displayed on the customer's mobile device, as shown in interface 470 of FIG. 8. Providing the customer's name to the virtual mobile device and/or providing the enterprise name to the customer's mobile device is described in detail below.

FIG. 1 shows an example method 100 of displaying an obtained customer name on a virtual mobile device portion of an integrated interface in association with a communication from a mobile device of a customer according to an implementation of the disclosed subject matter. At operation 110, a server (e.g., enterprise server 404 shown in FIGS. 6-7, server 502 shown in FIG. 10, and/or enterprise server 800 shown in FIG. 12) may output an integrated interface (e.g., integrated interface 320 shown in FIG. 5) to be displayed in a browser including a text-based interface (e.g., text-based interface 300 shown in FIG. 5) of an application and an interface for a virtual mobile device (e.g., virtual mobile device 312 shown in FIG. 3, virtual mobile device 402 shown in FIGS. 6-7, virtual mobile device 460 shown in FIG. 8, and/or virtual mobile device 504*a* shown in FIG. 10) separate from the text-based interface. The virtual mobile device may emulate operations and/or a user interface of a specific type of hardware mobile device. The virtual mobile device may emulate the operation and/or interface of a particular type of hardware mobile device, so that the operations and interface of the virtual mobile device may appear to a user to be the same and/or operate the same as a hardware mobile device.

In some implementations, the hardware mobile device may be any mobile device and/or computing device that may execute an operating system version of the hardware mobile device (e.g., a smartphone or the like). The mobile device and/or computing device may be a tablet device, wearable computing device, or the like.

At operation 120, the server may receive an indication of a communication from a mobile device (e.g., customer device 520*a* shown in FIG. 10, and/or device 500 shown in FIG. 12) of a customer. The communication may be a text message, a phone call, a video call, an email, or the like.

At operation 130, the server may obtain a customer name associated with the mobile device based on at least one of a certificate that includes the customer name retrieved by the server from a third party server, and a database record that includes the customer name that is retrieved by the server from a database.

Figure 10:
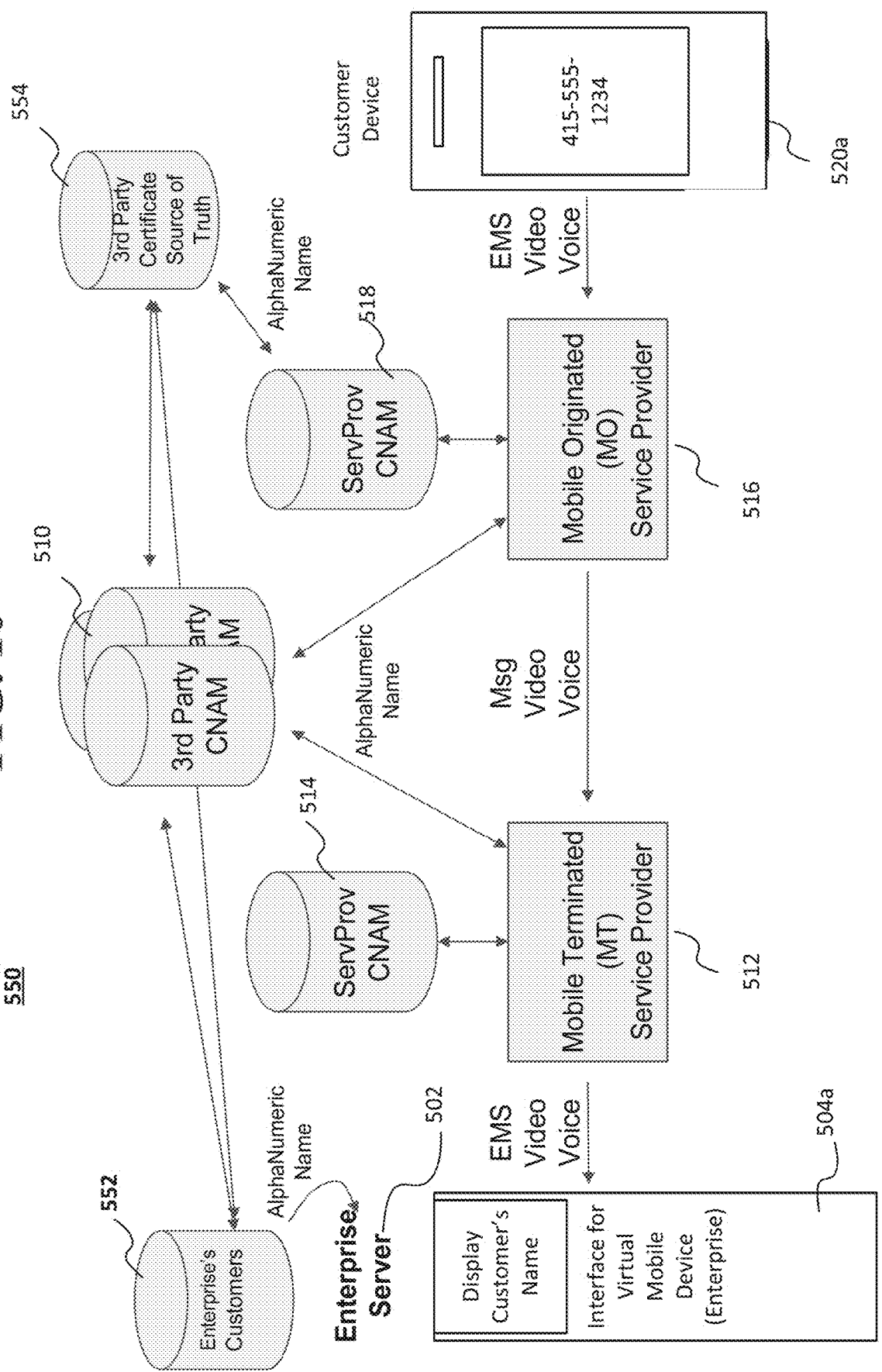
FIG. 10 shows consumer to enterprise communications according to an implementation of the disclosed subject matter.

For example, the enterprise server 502 shown in FIG. 10 may determine the name of the customer initiating the communication from the customer mobile device 520*a* from database 518 communicatively coupled to the mobile originated service provider 516, from database 514 communicatively coupled to the mobile terminated service provider 512, and/or from third party database 510. The third party database 510 may be a database communicatively coupled to a telephone system. In some implementations, the third party database 510 may be a third party communication database. The database 510 and/or the database 518 may receive a certificate that includes the customer name from the third party certificate of truth database 554, and databases 510, 518 may provide the certificate and/or the customer name to enterprise server 502.

At operation 140, the obtained customer name may be displayed on the virtual mobile device portion of the integrated interface in association with the communication from the mobile device of the customer. For example, as shown in FIG. 10, the virtual mobile device 504*a* may display the customer's name. In some implementations, the integrated interface (e.g., integrated interface 320 shown in FIG. 5) may display customer information based on the enterprise server 502 retrieving at least one customer record from the enterprise database 552 and based on the obtained customer's name. The customer records may include customer contact information, customer profile information, goods and/or services that the customer has purchased, or the like.

The user interface emulated by the virtual mobile device may be different based on the specific type of hardware mobile device and/or a specific type of operating system version of the hardware mobile device. For example, different hardware mobile devices may operate differently, and may have different operating system versions. Applications that are executed by the hardware mobile device may have different user interfaces based on the operating system version and/or hardware mobile device. The operations emulated by the virtual mobile device may be different, based on the specific type of hardware mobile device and/or the specific operating system version of the hardware mobile device.

In some implementations, the server may receive a selection for a specific type of hardware mobile device and/or a specific type of operating system version of a hardware mobile device from a plurality of hardware mobile devices. For example, a user may make a selection in the integrated interface (e.g., integrated interface 320 shown in FIG. 5) for a hardware mobile device from a plurality of hardware mobile devices. In another example, the user may make a selection in the integrated interface (e.g., integrated interface 320 shown in FIG. 5) for an operating system version of the hardware mobile device. The virtual mobile device (e.g., virtual mobile device 312 shown in FIG. 5, virtual mobile device 402 shown in FIG. 6, virtual mobile device 504*a* shown in FIG. 10, and/or virtual mobile device 602 shown in FIG. 11), may emulate operations and the user interface of the selected specific type of hardware mobile device and/or the selected specific type of operating system version of the hardware mobile device.

Figure 2:
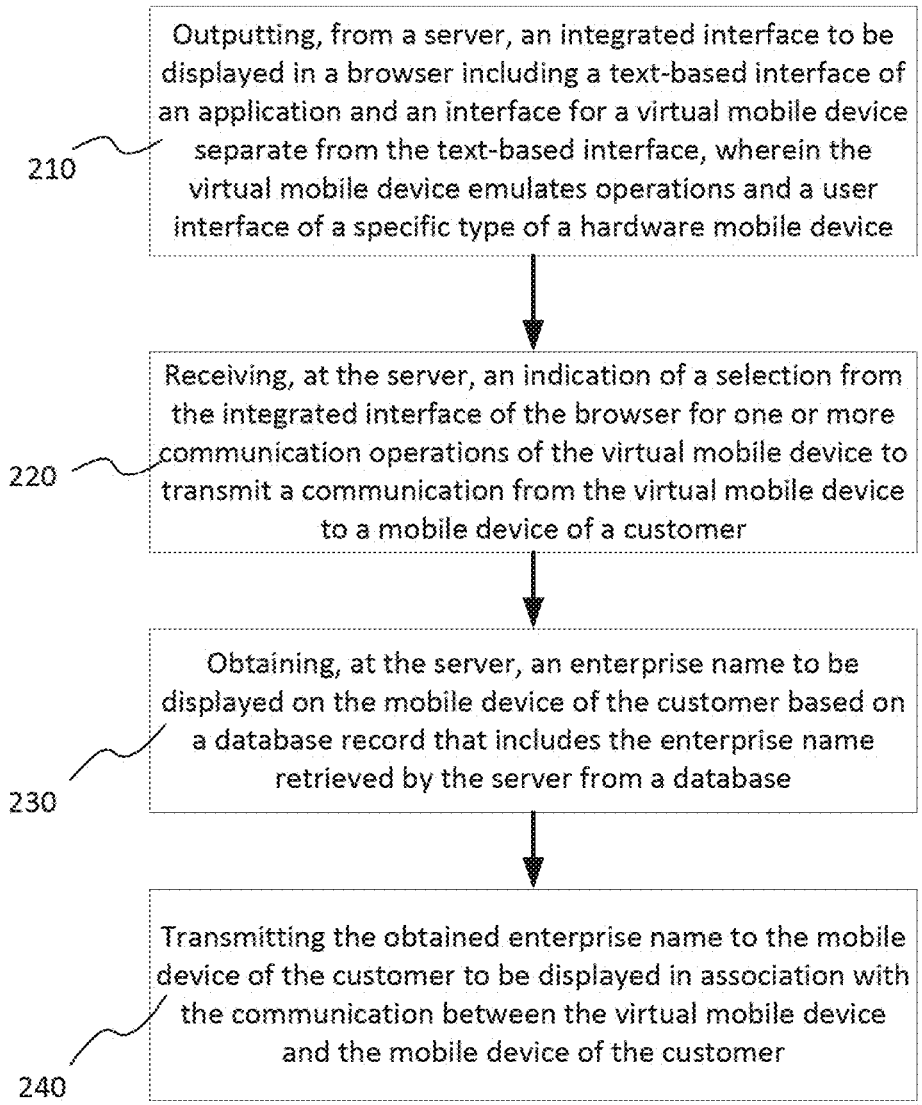
FIG. 2 shows an example method of transmitting an obtained enterprise name to a mobile device of a customer to be displayed in association with a communication between a virtual mobile device and the mobile device of a customer according to an implementation of the disclosed subject matter.

FIG. 2 shows an example method 200 of transmitting an obtained enterprise name to a mobile device of a customer to be displayed in association with a communication between a virtual mobile device and the mobile device of a customer according to an implementation of the disclosed subject matter.

At operation 210, the server (e.g., enterprise server 502 shown in FIG. 9) may output an integrated interface (e.g., integrated interface 320 shown in FIG. 5, which may include the interface for a virtual mobile device 504 shown in FIG. 9) to be displayed in a browser including a text-based interface (e.g., text interface 300 shown in FIGS. 3 and 5) of an application and an interface for a virtual mobile device (e.g., virtual mobile device 310 shown in FIGS. 3 and 5, and/or the virtual mobile device 504 shown in FIG. 9) separate from the text-based interface. As discussed throughout, the virtual mobile device may emulate operations and/or a user interface of a specific type of a hardware mobile device and/or a specific type of operating system version of the hardware mobile device.

Figure 9:
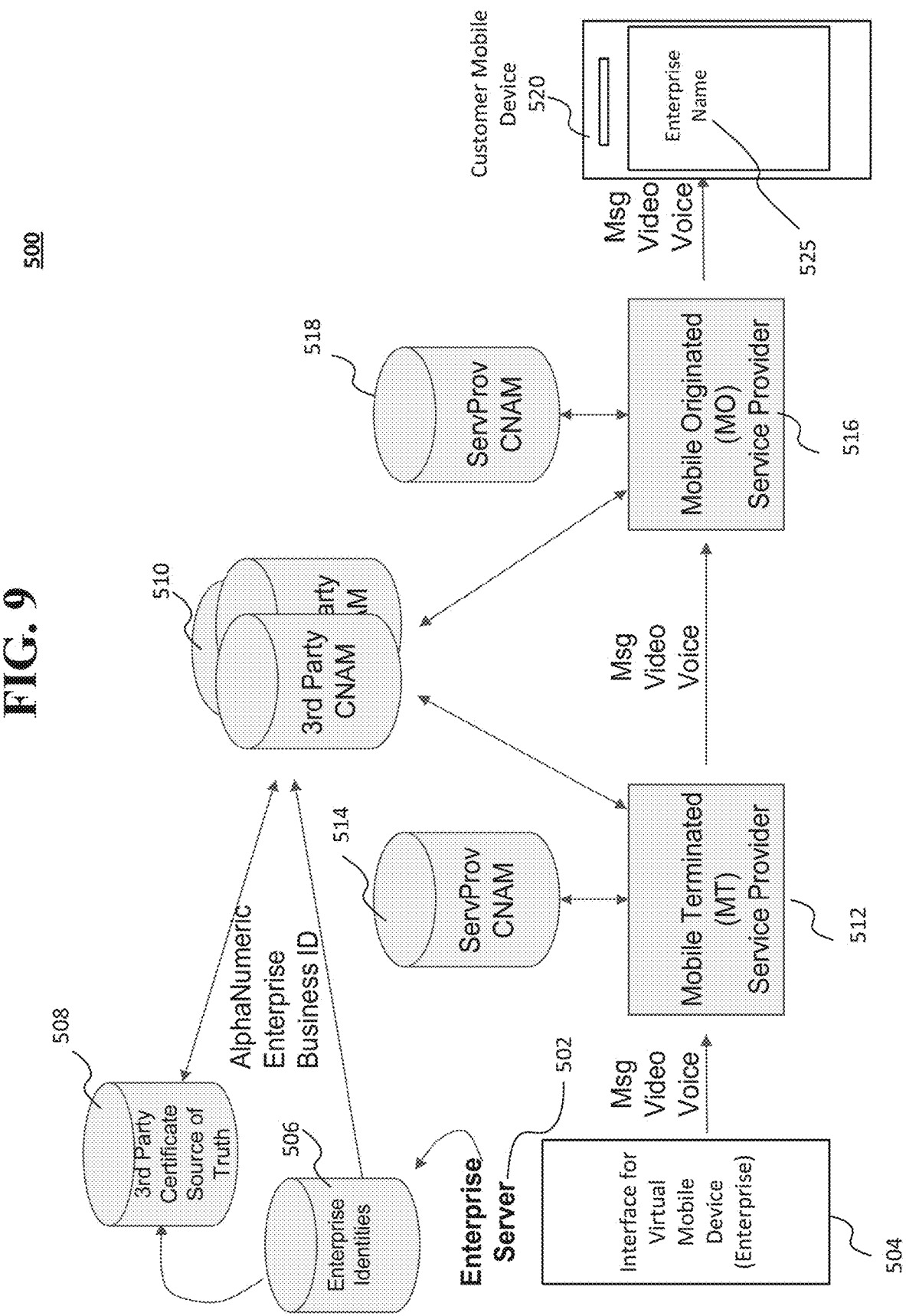
FIG. 9 shows enterprise to consumer communications according to an implementation of the disclosed subject matter.

At operation 220, the server may receive an indication of a selection from the integrated interface of the browser for one or more communication operations (e.g., a texting operation, a phone operation, a video communication, an email operation, or the like) of the virtual mobile device to transmit a communication from the virtual mobile device to a mobile device of a customer (e.g., customer mobile device 520 shown in FIG. 9).

At operation 230, the server may obtain an enterprise name to be displayed on the mobile device of the customer (e.g., enterprise name 525 displayed on customer mobile device 520 shown in FIG. 9) based on a database record that includes the enterprise name retrieved by the server from a database. For example, the enterprise server 506 may obtain the enterprise name from enterprise name identity database 506.

At operation 240, the obtained enterprise name may be transmitted to the mobile device of the customer (e.g., customer mobile device 520 shown in FIG. 9) to be displayed in association with the communication between the virtual mobile device (e.g., virtual mobile device 504) and the mobile device of the customer. In some implementations, the enterprise name may be transmitted to at least one of a database of certificates that provides a certificate that includes the enterprise name, a mobile terminated service provider database, a mobile originated service provider database, and a third party system database. For example, the enterprise name may be transmitted from the enterprise identities database 506 to the database 510 shown in FIG. 9, which may be accessed by the mobile terminated service provider 512 and/or the mobile originated service provider 516, which may transmit the enterprise name to the customer mobile device 520 for display (e.g., display enterprise name 525). In another example, the enterprise name may be transmitted in a certificate from a third party certificate of truth database 508 to database 510, which may be accessed by the mobile terminated service provider 512 and/or the mobile originated service provider 516, which may transmit the enterprise name to the customer mobile device 520 for display (e.g., display enterprise name 525). In some implementations, the enterprise name may be transmitted to an aggregator of a mobile terminated (MT) service provider and a mobile originated (MO) service provider (e.g., similar to MO/MT aggregator 408*b* shown in FIG. 7.

In some implementations of method 200, the user interface emulated by the virtual mobile device may be different based on the specific type of hardware mobile device, the specific type of operating system version of the hardware mobile device, and/or the operations emulated by the virtual mobile device may be different based on the specific type of hardware mobile device. For example, the interface for the virtual mobile device 504 shown in FIG. 9 may be different based on the type of hardware mobile device and/or the operating system version of the hardware mobile device that is emulated. The hardware mobile devices may be emulated based on model, operating system version used, operation of applications for the device, and the like.

In some implementations, the server (e.g., enterprise server 502 shown in FIG. 9) may receive a selection for the specific type of hardware mobile device from a plurality of hardware mobile devices and/or a specific type of operating system version of a hardware mobile device. The virtual mobile device (e.g., virtual mobile device 504 shown in FIG. 9) may emulate operations and/or the user interface of the selected specific type of hardware mobile device. For example, a user may make a selection in the integrated interface (e.g., integrated interface 320 shown in FIG. 5) for a hardware mobile device from a plurality of hardware mobile devices. In another example, the user may make a selection in the integrated interface for an operating system version of a hardware mobile device. The virtual mobile device (e.g., virtual mobile device 312 shown in FIG. 5, virtual mobile device 402 shown in FIG. 6, virtual mobile device 504 shown in FIG. 9, and virtual mobile device 602 shown in FIG. 11), may emulate operations and the user interface of the selected specific type of hardware mobile device.

Figure 11:
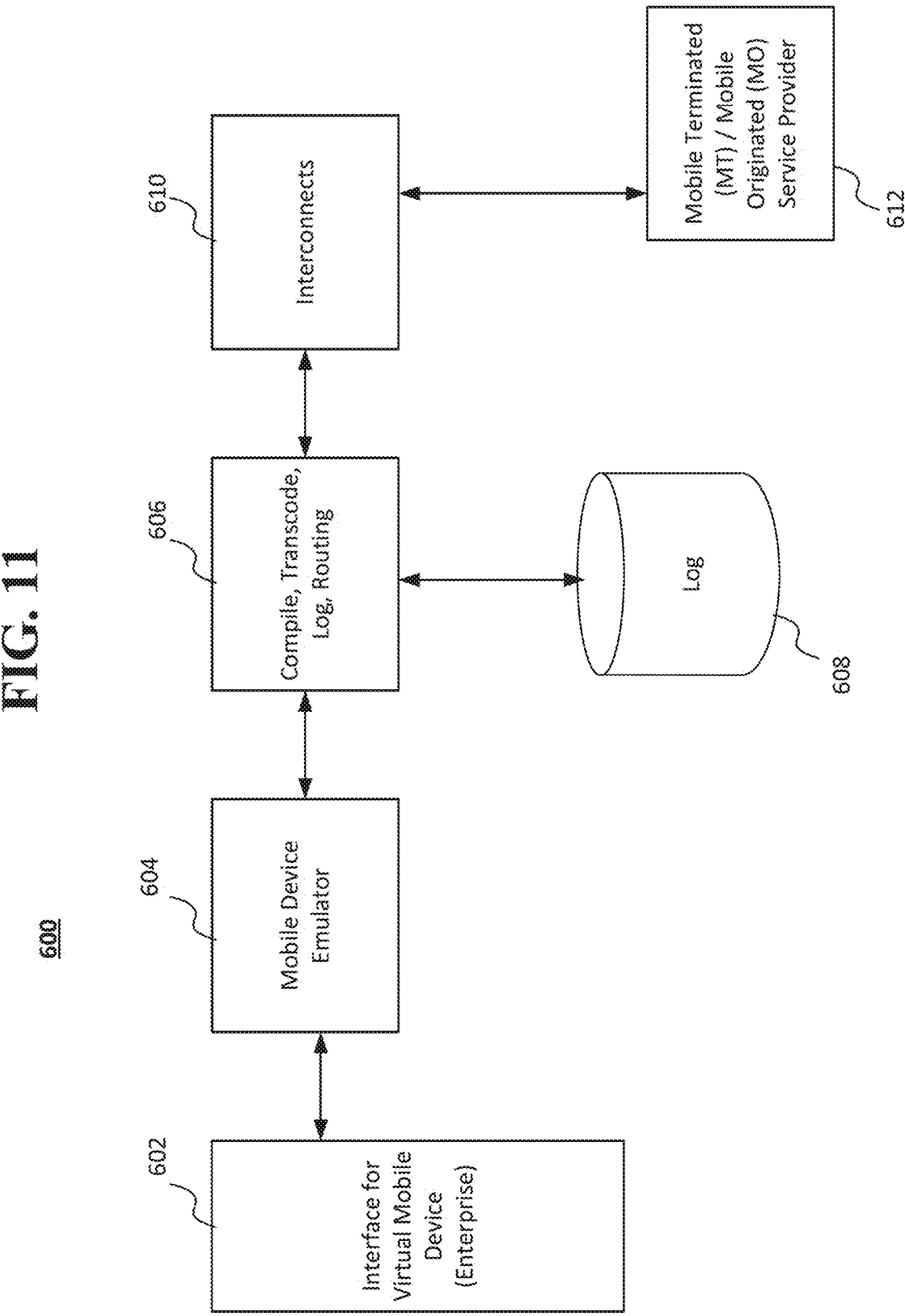
FIG. 11 shows an arrangement between a virtual mobile device and a MT/MO service provider according to an implementation of the disclosed subject matter.

FIG. 11 shows an arrangement 600 between a virtual mobile device 602 and a mobile terminated (MT)/mobile originated (MO) service provider 612 according to an implementation of the disclosed subject matter. The virtual mobile device may be displayed within a web browser. This differs from traditional virtual phones that have been limited to development kits. Such traditional virtual phones also operate as a native application, and do not operate in a browser environment. The mobile device emulator 604 may be hardware component communicatively coupled to a server (e.g., enterprise server 502 shown in FIGS. 9-10), and/or may be part of the server. The mobile device emulator 604 may generate graphics, text, communication operations for one or more communication applications, and/or one or more operations to execute an application and/or operating system. The mobile device emulator 604 may include an interface to complier, transcoding, and/or routing engine 606, which may be central for communications traffic processing between the user interface of the virtual mobile device 602 and the MT/MO service provider 612. The complier, transcoding, and/or routing engine 606 may determine difference between platforms, networks, and/or systems in the arrangement 600. That is, engine 606 may determine the customer mobile device coupled to the MT/MO service provider, a type of MT/MO service provider, and the like so that customer information (including the customer name) may be provided to the virtual mobile device 602. In some implementations the engine 606 may provide natural language translation (e.g., between Spanish and English, between Japanese and English, or the like) between the mobile originated (MO) user (e.g., the customer's mobile device 520 shown in FIG. 9) and the mobile terminated (MT) user (e.g., the virtual mobile device 504 shown in FIG. 9). The engine 606 may be any suitable combination of hardware and/or software. In some implementations, the engine 606 may be executed by an enterprise server (e.g., server 502 shown in FIGS. 9-10).

The log 608 may be a database to log one or more communications between the virtual mobile device 602 and, for example, customer mobile devices (e.g., the customer's mobile device 520 shown in FIG. 9). Log 608 may be communicatively coupled to engine 606.

Interconnects may provide interconnection such as dedicated communications lines, data paths, application programming interfaces (APIs), or the like to interface with a telecommunications provider, over-the-top (OTT) service provider, or the like.

Figure 12:
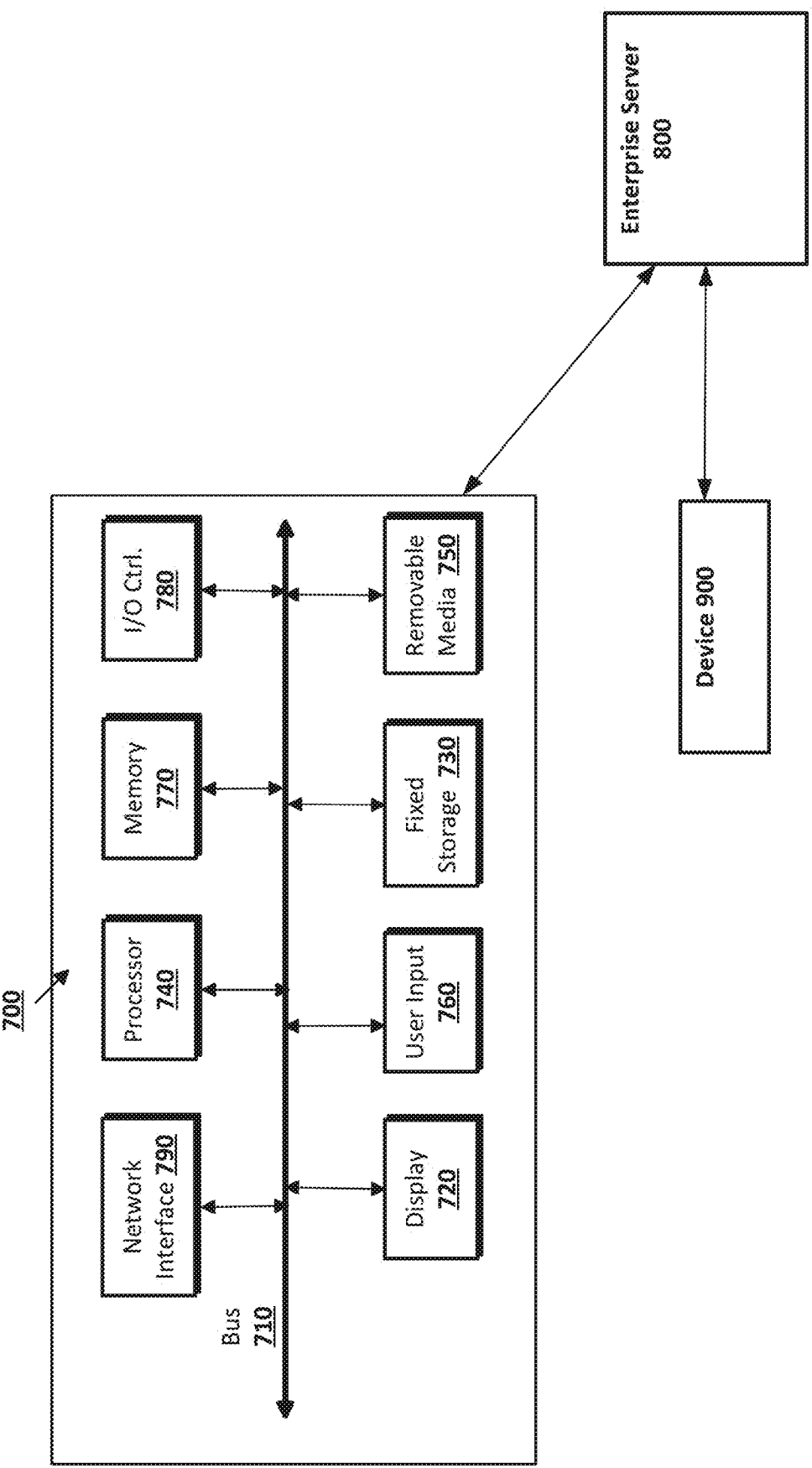
FIG. 12 shows a computer system according to an implementation of the disclosed subject matter.

Implementations of the presently disclosed subject matter may be implemented in and used with a variety of component and network architectures. FIG. 12 is an example device 700 suitable for implementing implementations of the presently disclosed subject matter. For example, the device 700 may be a customer mobile device 520 shown in FIG. 9, customer mobile device 520a shown in FIG. 10, or the like.

As discussed in further detail herein, the device 700 may be a single device, such as a mobile computing device, in a network of multiple computers. In some implementations, the device 700, 900 may be used to request data from one or more services, processing received data, and/or displaying a monitoring report from enterprise server 800. As shown in FIG. 12, the device 700, 900 may communicate with enterprise server 800, which may be a server, cloud server, database, cluster, application server, neural network system, or the like. Enterprise server 800 may be enterprise server 404 shown in FIGS. 6-7, and/or enterprise server 502 shown in FIGS. 9-10. The enterprise server 800 may use any suitable combination of any suitable volatile and non-volatile physical storage mediums, including, for example, hard disk drives, solid state drives, optical media, flash memory, tape drives, registers, and random access memory, or the like, or any combination thereof. The enterprise server may be communicatively coupled to database system 1200a-1200d shown in FIG. 13.

If the enterprise server is communicatively coupled to a multitenant system (e.g., database 406 shown in FIGS. 6-7, database 506 shown in FIGS. 9-10, and/or database systems 1200a-1200d shown in FIG. 13), the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The device 700 may include a bus 710 which interconnects major components of the computer 700, such as a central processor 740, a memory 770 (typically RAM, but which can also include ROM, flash RAM, or the like), an input/output controller 780, a user display 720, such as a display or touch screen via a display adapter, a user input interface 760, which may include one or more controllers and associated user input or devices such as a touchscreen, a keyboard, mouse, Wi-Fi/cellular radios, microphone/speakers and the like, and may be communicatively coupled to the I/O controller 780, fixed storage 730, such as a flash storage, stolid state memory, and the like, and a removable media component 750.

The bus 710 may enable data communication between the central processor 740 and the memory 770, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the device 700 may be stored on and accessed via a computer readable medium, such as a storage medium 730, 750, 770.

The fixed storage 730 can be integral with the device 700 or can be separate and accessed through other interfaces. A network interface 790 can provide a direct connection to a remote server via a telephone link, to the Internet via an internet service provider (ISP), or a direct connection to a remote server via a direct network link to the Internet via a POP (point of presence) or other technique. The network interface 790 can provide such connection using wireless techniques, including digital cellular telephone connection, Cellular Digital Packet Data (CDPD) connection, digital satellite data connection or the like. For example, the network interface 790 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 12-13 need not be present to practice the present disclosure. The components can be interconnected in different ways from that shown. Code to implement the present disclosure can be stored in computer-readable storage media such as one or more of the memory 770, fixed storage 730, removable media 750, or on a remote storage location.

Device 900 may be similar to device 700, and may be a mobile device, a computer, or the like that may be communicatively coupled to enterprise server 800. Device 900 may be used by an agent, representative, associate, or the like. Device 900 may display the integrated interface 320 shown in FIG. 5, the virtual mobile device 402 shown in FIGS. 6-7, virtual mobile device 504 shown in FIG. 9, virtual mobile device 504a shown in FIG. 10, and/or virtual mobile device 602 shown in FIG. 11.

Figure 13:
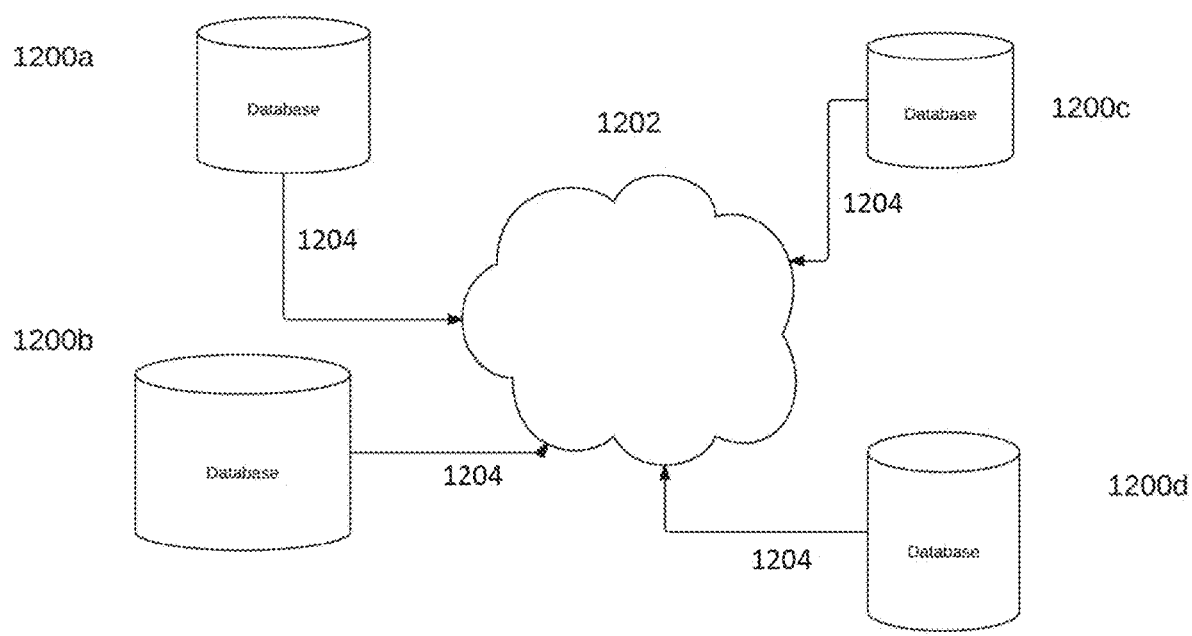
FIG. 13 shows a network configuration according to an implementation of the disclosed subject matter.

FIG. 13 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may store, for example, customer data, such as contact information, products and services purchased by the customer, and the like. In some implementations, the one or more of the database systems 1200*a-d* may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200*a-d* may be live or production instances processing and committing transactions received from users and/or developers, and/or from computing elements (not shown) for receiving and providing data for storage in the instances.

One or more of the database systems 1200*a-d* may include at least one storage device. For example, the storage can include memory, fixed storage, removable media, or the like. The tenant can have tenant data stored in an immutable storage of the at least one storage device associated with a tenant identifier.

In some implementations, the one or more servers shown in FIGS. 12-13 can store the data (e.g., requested data that is part of a service, data for a monitoring report, and the like) in the immutable storage of the at least one storage device (e.g., a storage device associated with enterprise server 800, and/or the database systems 1200*a*-1200*d*) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "outputting," "receiving," "transmitting," "displaying." "emulating," or the like refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
outputting, from a server, an integrated interface to be displayed in a browser including a text-based interface of a customer relationship management (CRM) application and an interface for a virtual mobile device separate from the text-based interface of the CRM application, wherein the virtual mobile device emulates operations and a user interface of a specific type of hardware mobile device;
receiving, at the server, an indication of a communication from a mobile device of a customer, wherein the server is configured to receive indications of text, voice, video, and email communications;
obtaining, at the server, a customer name associated with the mobile device based on the received indication and at least one from the group consisting of:
(a) a certificate that includes the customer name retrieved by the server from a third party server, and
(b) a database record that includes the customer name that is retrieved by the server from a database that is selected from at least one of the group consisting of: a first database record from a mobile terminated service provider database, and a second database record from a mobile originated service provider database; and
displaying the obtained customer name on the virtual mobile device portion of the integrated interface in association with the communication from the mobile device of the customer.

2. The method of claim 1, wherein the obtaining the customer name further comprises:
obtaining, at the server, the customer name from at least one selected from the group consisting of: a certificate that includes the customer name retrieved by the server from a third party server, a third database record from a telephone system database, and a fourth database record from a third party communication database.

3. The method of claim 1, wherein the obtaining the customer name further comprises:
obtaining, at the server, the customer name from an aggregator of a mobile terminated service provider and a mobile originated service provider.

4. The method of claim 1, wherein the user interface emulated by the virtual mobile device is different based on a specific type of operating system version of the hardware mobile device.

5. The method of claim 1, wherein the operations emulated by the virtual mobile device are different based on the specific type of hardware mobile device.

6. The method of claim 1, wherein the operations emulated by the virtual mobile device are different based on a specific type of operating system version of the hardware mobile device.

7. The method of claim 1, further comprising:
receiving, at the server, a selection for the specific type of hardware mobile device from a plurality of hardware mobile devices,
wherein the virtual mobile device emulates operations and the user interface of the selected specific type of hardware mobile device.

8. The method of claim 1, further comprising:
receiving, at the server, a selection for a specific type operating system version of the hardware mobile device,
wherein the virtual mobile device emulates operations and the user interface of the selected specific type of operating system version.

9. A method comprising:
outputting, from a server, an integrated interface to be displayed in a browser including a text-based interface of a customer relationship management (CRM) application and an interface for a virtual mobile device separate from the text-based interface of the CRM application, wherein the virtual mobile device emulates operations and a user interface of a specific type of a hardware mobile device;
receiving, at the server, an indication of a selection from the integrated interface of the browser for one or more communication operations of the virtual mobile device to transmit a communication from the virtual mobile device to a mobile device of a customer, wherein the server is configured to receive indications of text, voice, video, and email communications;
obtaining, at the server, an enterprise name to be displayed on the mobile device of the customer based on the received indication and based on a database record that includes the enterprise name retrieved by the server from a database selected from the group consisting of: a third party server that provides a certificate with the enterprise name, a mobile terminated service provider database, and a mobile originated service provider database; and
transmitting the obtained enterprise name to the mobile device of the customer to be displayed in association with the communication between the virtual mobile device and the mobile device of the customer.

10. The method of claim 9, wherein the transmitting the enterprise name further comprises:
transmitting the enterprise name to at least one selected from the group consisting of: a database of certificates that provides a certificate that includes the enterprise name, a third party system database, and a fourth database record from a third party communication database.

11. The method of claim 9, wherein the transmitting the enterprise name further comprises:
transmitting the enterprise name to an aggregator of a mobile terminated service provider and a mobile originated service provider.

12. The method of claim 9, wherein the user interface emulated by the virtual mobile device is different based on a specific type of operating system version of the hardware mobile device.

13. The method of claim 9, wherein the operations emulated by the virtual mobile device are different based on the specific type of hardware mobile device.

14. The method of claim 9, wherein the operations emulated by the virtual mobile device are different based on a specific type of operating system version of the hardware mobile device.

15. The method of claim 9, further comprising:
receiving, at the server, a selection for the specific type of hardware mobile device from a plurality of hardware mobile devices,
wherein the virtual mobile device emulates operations and the user interface of the selected specific type of hardware mobile device.

16. The method of claim 9, further comprising:
receiving, at the server, a selection for a specific type of operating system version of the hardware mobile device,
wherein the virtual mobile device emulates operations and the user interface of the selected specific type of operating system version of the hardware mobile device.

\* \* \* \* \*